United States Patent
Hsu et al.

(10) Patent No.: US 10,691,229 B2
(45) Date of Patent: Jun. 23, 2020

(54) POINTER

(71) Applicant: SHENZHEN PU YING INNOVATION TECHNOLOGY CORP., LTD., Shenzhen (CN)

(72) Inventors: Chung-Wen Hsu, Shenzhen (CN); Chung-Hsuan Li, Shenzhen (CN)

(73) Assignee: SHENZHEN PU YING INNOVATION TECHNOLOGY CORP., LTD., Shenzhen (CN)

( * ) Notice: Subject to any disclaimer, the term of this patent is extended or adjusted under 35 U.S.C. 154(b) by 87 days.

(21) Appl. No.: 15/981,551

(22) Filed: May 16, 2018

(65) Prior Publication Data

US 2019/0179432 A1    Jun. 13, 2019

(30) Foreign Application Priority Data

Dec. 8, 2017 (CN) .......................... 2017 1 1293886

(51) Int. Cl.
    *G06F 3/0354*      (2013.01)

(52) U.S. Cl.
    CPC ................ *G06F 3/03545* (2013.01)

(58) Field of Classification Search
    CPC .................................................. G06F 3/03545
    See application file for complete search history.

(56) References Cited

U.S. PATENT DOCUMENTS

| | | | |
|---|---|---|---|
| 5,565,632 A * | 10/1996 | Ogawa | G06F 3/03545 73/862.041 |
| 9,239,639 B1 * | 1/2016 | Vanderet | G06F 3/03545 |
| 9,612,671 B1 * | 4/2017 | Blaszczak | G06F 3/039 |
| 10,240,990 B2 * | 3/2019 | Obata | G06F 3/046 |
| 2003/0095115 A1 | 5/2003 | Brian et al. | |

(Continued)

FOREIGN PATENT DOCUMENTS

| TW | 201040797 | * 11/2010 |
|---|---|---|
| TW | 201040797 A | 11/2010 |

(Continued)

OTHER PUBLICATIONS

Office Action issued in corresponding Taiwan patent application dated Sep. 17, 2018.

*Primary Examiner* — Temesghen Ghebretinsae
*Assistant Examiner* — Karin Kiyabu
(74) *Attorney, Agent, or Firm* — Rabin & Berdo, P.C.

(57) ABSTRACT

A pointer includes a casing, a first electromagnetic unit, a second electromagnetic unit, a first elastic member, and a pen point. The casing has an accommodation space and a port in communication with the accommodation space. The first electromagnetic unit includes a first magnet and a coil winding around the first magnet. The first magnet is fixedly disposed in the accommodation space. The second electromagnetic unit is movably disposed in the accommodation space along an axial direction, where the second electromagnetic unit includes a second magnet and a protection member wrapping the second magnet, and the second magnet is relatively away from or close to the first magnet. The elastic member is disposed in the casing and can provide an elastic force to the second electromagnetic unit along the axial direction. The pen point is movably disposed at the port and connected to the protection member.

11 Claims, 10 Drawing Sheets

(56) References Cited

U.S. PATENT DOCUMENTS

| | | | |
|---|---|---|---|
| 2006/0060393 A1* | 3/2006 | Fukushima | G06F 3/046 178/20.03 |
| 2011/0074741 A1* | 3/2011 | Liang | G06F 3/03545 345/179 |
| 2013/0009907 A1 | 1/2013 | Rosenberg et al. | |
| 2013/0199311 A1* | 8/2013 | Horie | G01L 1/142 73/862.626 |
| 2013/0321353 A1* | 12/2013 | Chikami | G06F 3/03545 345/179 |
| 2014/0069532 A1* | 3/2014 | Obata | G01L 1/148 137/554 |
| 2016/0018912 A1* | 1/2016 | Kaneda | G06F 3/03545 345/179 |
| 2017/0341458 A1* | 11/2017 | Kaneda | G06F 3/046 |
| 2018/0209818 A1* | 7/2018 | Miyazawa | G01D 5/204 |
| 2018/0267636 A1* | 9/2018 | Chiu | G06F 1/1643 |
| 2019/0265811 A1* | 8/2019 | Lien | G06F 3/03545 |

FOREIGN PATENT DOCUMENTS

| | | |
|---|---|---|
| TW | 201324252 A | 6/2013 |
| TW | M478194 U | 5/2014 |
| TW | 201502878 A | 1/2015 |
| WO | 2016079776 A1 | 5/2016 |
| WO | 2017110338 A1 | 6/2017 |

* cited by examiner

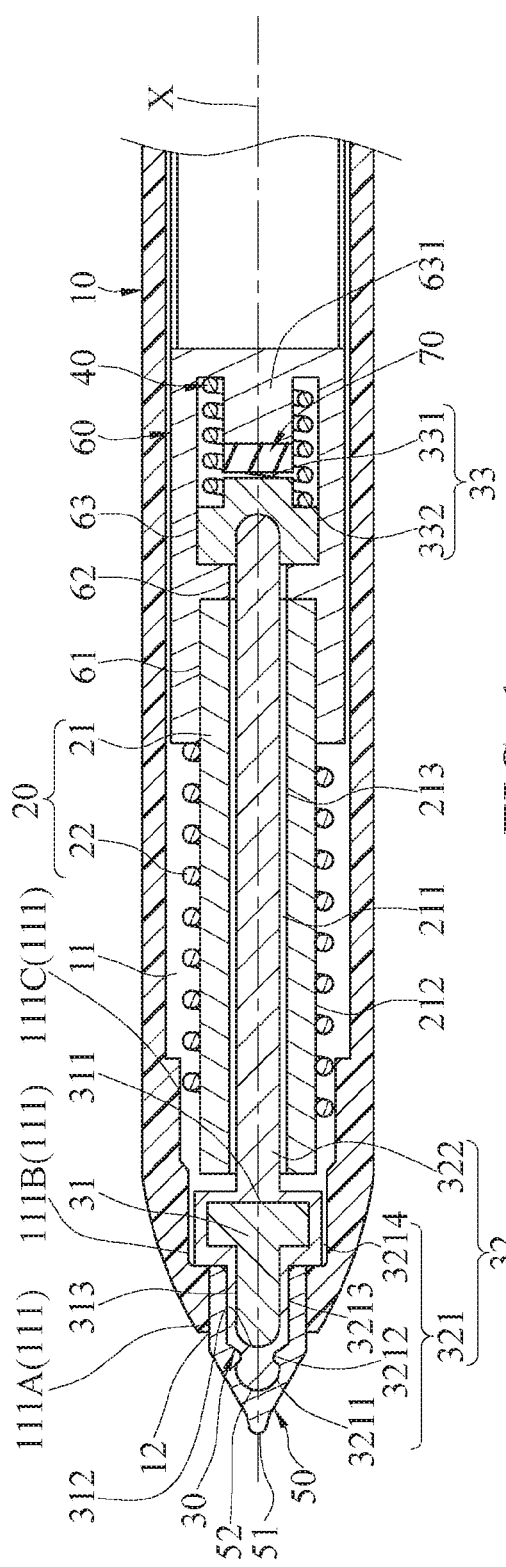
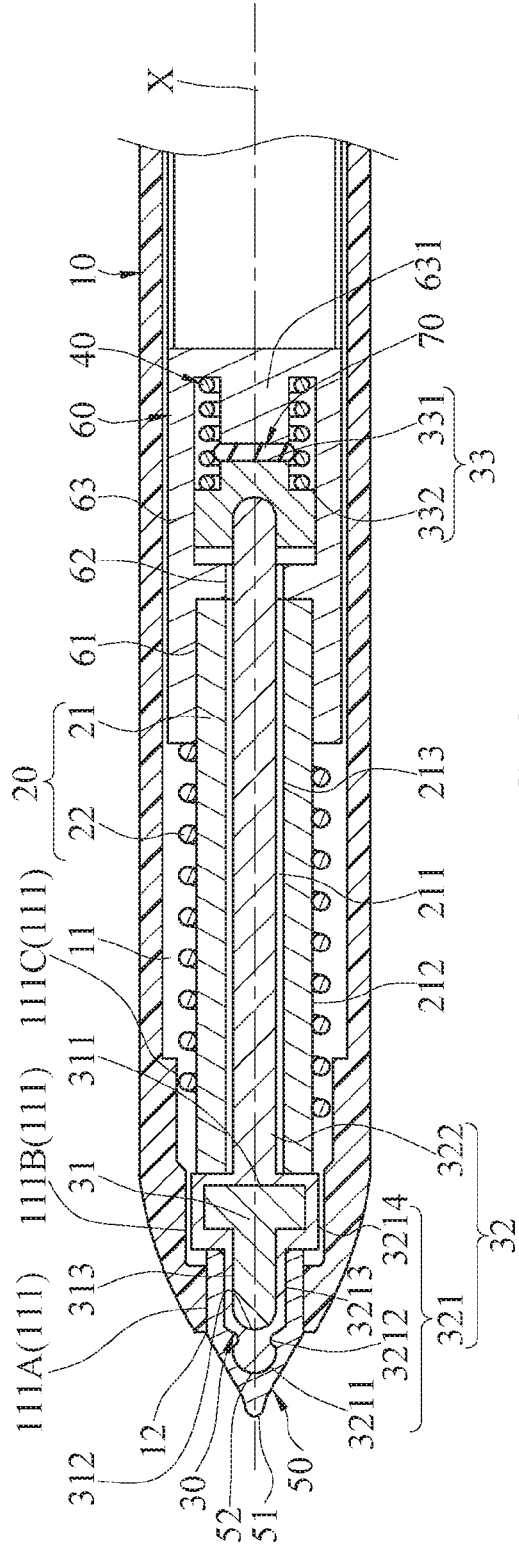
FIG. 1
FIG. 2

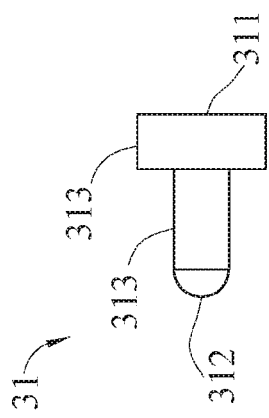
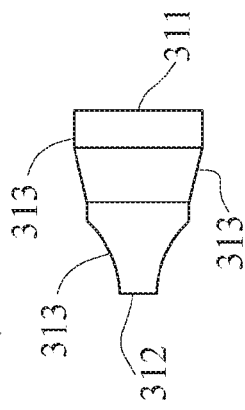
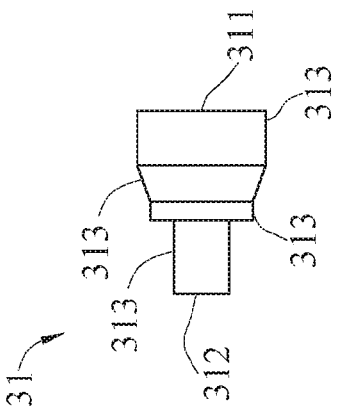
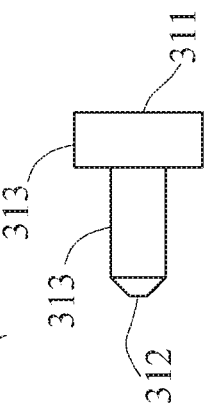

US 10,691,229 B2

POINTER

CROSS-REFERENCE TO RELATED APPLICATION

This non-provisional application claims priority under 35 U.S.C. § 119(a) to Patent Application No. 201711293886.3 filed in China, P.R.C. on Dec. 8, 2017, the entire contents of which are hereby incorporated by reference.

BACKGROUND

Technical Field

Embodiments of the present invention relate to a pointer, and in particular, to an electromagnetic induction pointer.

Related Art

With development of sciences and technologies, in increasing electronic devices such as smartphones, tablet computers, or personal digital assistants (PDA), a touch panel is used as an operating interface, so that a user operates the touch panel in a touch manner and convenience is improved. Moreover, to make a process of operating the touch panel more rapid and precise, input (for example, writing or tapping) may be performed in cooperation with a pointer of a pen shape.

A form of the pointer depends on a touch manner of the touch panel. Currently, relatively widely applied touch manners of the touch panel include a resistive touch manner, a capacitive touch manner, an electromagnetic touch manner, and the like. In the electromagnetic touch technology, a digitizer tablet is mainly used to detect an electromagnetic signal emitted by a pointer to form handwriting. In use, the pointer can generate different electromagnetic signals because of different pressures applied to a pen point, and the digitizer tablet performs calculation according to a sensed electromagnetic signal by using a proper algorithm to determine a location of the pointer and a pen touch pressure. How to improve accuracy and resolution of location coordinates and a pen touch pressure of an electromagnetic pointer is one of performances that a person skilled in the art urgently intends to improve.

SUMMARY

This application provides a pointer, directed to diminish a change value of a sensed signal deviating from an ideal value.

To achieve the foregoing objective, this application provides a pointer, including a casing, a first electromagnetic unit, a second electromagnetic unit, a first elastic member, and a pen point. The casing has an accommodation space and a port, where the port is in communication with the accommodation space. The first electromagnetic unit includes a first magnet and a coil, where the first magnet is fixedly disposed in the accommodation space, and the coil winds around the first magnet. The second electromagnetic unit is movably disposed in the accommodation space of the casing along an axial direction, where the second electromagnetic unit includes a second magnet and a protection member, the protection member wraps the second magnet, and the second magnet is relatively away from or close to the first magnet. The elastic member is disposed in the accommodation space and can provide an elastic force to the second electromagnetic unit along the axial direction. The pen point is movably disposed at the port of the casing and connected to the protection member.

In this application, the protection member wraps the second magnet to form the second electromagnetic unit, and then the second electromagnetic unit is connected to the pen point. Therefore, when the pen point is subjected to an impact force, the protection member buffers the applied force by means of a buffering capability thereof, so as to prevent the second magnet from being damaged or deviating from the axis, thereby ensuring that a generated signal change conforms to anticipation, and ensuring accuracy and resolution of location coordinates and a pen touch pressure of the electromagnetic pointer.

BRIEF DESCRIPTION OF THE DRAWINGS

The present invention will become more fully understood from the detailed description given herein below for illustration only, and thus are not limitative of the present invention, and wherein:

FIG. 1 is a schematic structural cross-sectional diagram of an embodiment of a pointer of the present invention.

FIG. 2 is a schematic diagram of a use state of a pressed pen point in an example of FIG. 1.

FIG. 13 to FIG. 28 show other appearance patterns of a second magnet of a pointer of the present invention.

DETAILED DESCRIPTION

Figure 3:
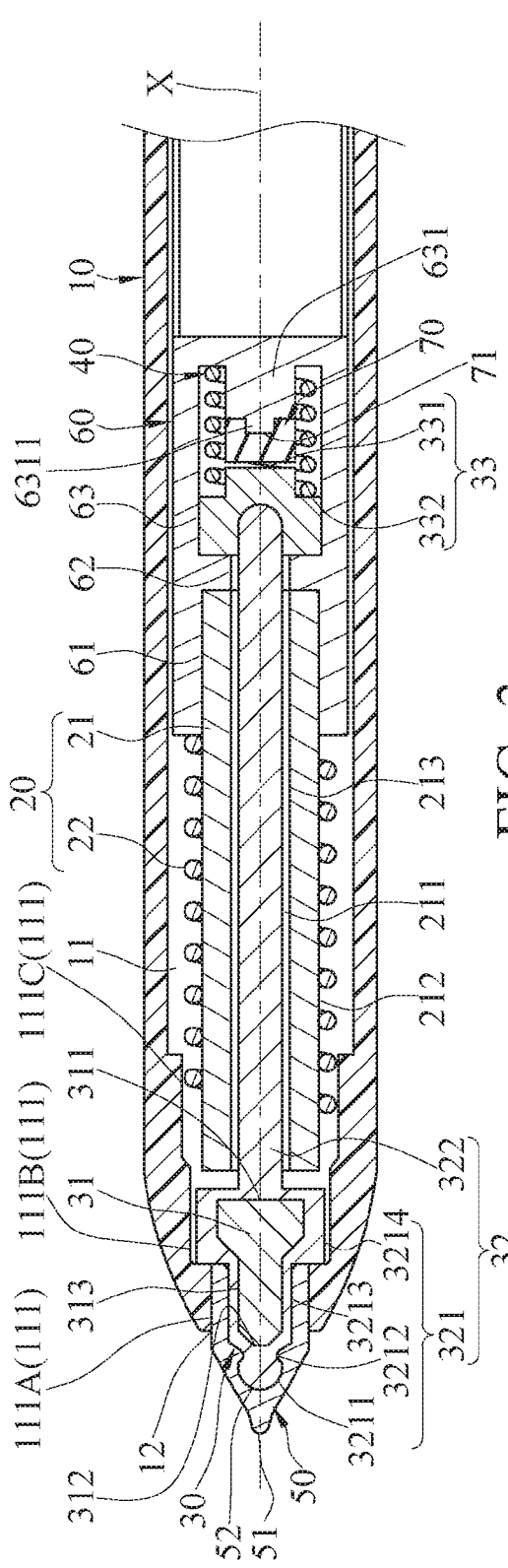
FIG. 3 is a schematic structural cross-sectional diagram of another embodiment of a pointer of the present invention.

Referring to FIG. 1 cooperatively, FIG. 1 is a schematic structural cross-sectional diagram of an embodiment of a pointer of the present invention. In this case, the pointer is a passive or active electromagnetic induction pointer that has a circuit unit and that is used in cooperation with a digitizer tablet.

The pointer shown in FIG. 1 includes a casing 10, a first electromagnetic unit 20, a second electromagnetic unit 30, an elastic member, and a pen point 50. The casing 10 has an accommodation space 11 and a port 12 in communication with the accommodation space 11. The first electromagnetic unit 20 includes a first magnet 21 and a coil 22 winding around the first magnet 21. The first electromagnetic unit 20 is fixedly disposed in the accommodation space 11. The second electromagnetic unit 30 includes a second magnet 31 and a protection member 32 wrapping the second magnet 31, and the second electromagnetic unit 30 is movably accommodated in the accommodation space 11. The elastic member is disposed in the casing 10 and can provide an elastic force to the second electromagnetic unit 30 along an axial direction X. The pen point 50 is movably disposed at the port 12 and connected to the protection member 32.

Therefore, in use, the digitizer tablet emits electromagnetic energy, and the pointer receives the electromagnetic energy emitted by the digitizer tablet. The coil 22 induces and is coupled to the electromagnetic energy. When the pointer acts on the digitizer tablet and applies a pressure to the pen point 50, the pen point 50 drives the second magnet 31 to generate a displacement relative to the first magnet 21 and then changes an inductance value of the coil 22. In this way, the digitizer tablet may receive an electromagnetic signal emitted by the pointer, and perform calculation according to the magnitude and the frequency of the electromagnetic signal emitted by the pointer and by using a proper algorithm to obtain a location of the pointer and a pen touch pressure, and then generate handwriting. The protection member 32 may provide buffering when the pointer is subjected to an impact force, to prevent the second magnet 31 from being damaged or the central axis from deviating, thereby improving product service life and ensuring accuracy and resolution of location coordinates and a pen touch pressure of the electromagnetic pointer.

In an embodiment, referring to FIG. 1 continuously, the casing 10 is a hollow strip pen-shaped casing whose length extends along the axial direction X but is not limited thereto. In this case, the casing 10 is of a pattern whose one end is opened and another end is closed but is not limited thereto. Further, the accommodation space 11 of the casing 10 is divided into a plurality of sections 111 used to correspondingly accommodate the first electromagnetic unit 20, the second electromagnetic unit 30, and the pen point 50.

More specifically, further referring to FIG. 1, in this embodiment, the accommodation space 11 of the casing 10 is sequentially divided into a first section 111A, a second section 111B, and a third section 111C from the port 12 to another end. In this case, the inner diameter of the first section 111A is less than the inner diameter of the second section 111B, and the inner diameter of the second section 111B is less than the inner diameter of the third section 111C. Therefore, the first electromagnetic unit 20 corresponds to a location located at the third section 111C, the second electromagnetic unit 30 corresponds to a location located at the second section 111B, and the pen point 50 corresponds to a location located at the first section 111A.

In an embodiment, similarly referring to FIG. 1 cooperatively, the first magnet 21 of the first electromagnetic unit 20 is a hollow column but is not limited thereto. The first magnet 21 has a through-hole 211, the through-hole 211 runs through two ends of the first magnet 21, the first magnet 21 has an outer surface 212 and an inner surface 213, and a range surrounded by the inner surface 213 defines the through-hole 211. Moreover, in this embodiment, the first magnet 21 is made of a magnetic material. The coil 22 winds around the outer surface 212 of the first magnet 21, and the coil 22 and the first magnet 21 are jointly is accommodated in the third section 111C. In this case, two ends of the coil 22 may be connected to a circuit unit through two conductive wires, and the circuit unit may be fixedly disposed in the accommodation space 11 (not shown in the figure).

The protection member 32 of the second electromagnetic unit 30 may completely wrap or locally wrap the second magnet 31. The second electromagnetic unit 30 may be movably accommodated in the accommodation space 11 between the port 12 of the casing 10 and another end. Moreover, when the second electromagnetic unit 30 is accommodated in the accommodation space 11, the second magnet 31 remains being located at a location between the port 12 and the first magnet 21, and there is a distance between a head section 321 of the protection member 32 of the second electromagnetic unit 30 and the first magnet 21 in the axial direction X.

Then referring to FIG. 1 cooperatively, in an embodiment, the protection member 32 completely wraps the second magnet 31 in an in-mold forming manner but is not limited thereto. In this case, the protection member 32 has the head section 321 and a shaft portion 322, the head section 321 completely wraps the second magnet 31, and the shaft portion 322 coaxially extends along the central axis of the second magnet 31 to be of a strip structure. The protection member 32 is made of a material having a buffering capability. For example, the protection member 32 may be made of ABS (Acrylonitrile Butadiene Styrene) resin or a mixture material of ABS resin and PC (Polycarbonate) plastic but is not limited thereto. The protection member 32 having the buffering capability wraps the second magnet 31 so as to protect the second magnet 31.

Referring to FIG. 1 and FIG. 2 cooperatively, in this embodiment, an outline range of the through-hole 211 of the first magnet 21 is greater than an outline range of the shaft portion 322 of the protection member 32. More specifically, when the through-hole 211 is a circular hole, and the shaft portion 322 is a round bar, the diameter of the through-hole 211 is greater than the outer diameter of the shaft portion 322. When the second electromagnetic unit 30 is accommodated in the accommodation space 11, the head section 321 of the protection member 32 corresponds to a location located at the first section 111A and the second section 111B, and the shaft portion 322 of the protection member 32 runs through the through-hole 211 of the first magnet 21, thereby diminishing the needed outer diameter of the casing, and achieving a light and handy structure. Moreover, the head section 321 of the protection member 32 further abuts against a section gap between the first section 111A and the second section 111B, so that the protection member 32 may be limited to moving in the accommodation space 11 and cannot be easily disengaged from the port 12.

Additionally, in an embodiment, referring to FIG. 1 and FIG. 2, the second magnet 31 has a first end 311 and a second end 312 opposite to each other, the outer diameter of the first end 311 is greater than the outer diameter of the second end 312, and the first end 311 of the second magnet 31 is closer to the first magnet 21 compared with the second end 312, that is, the second end 312 of the second magnet 31 is closer to the port 12 compared with the first end 311. Therefore, because the size of the second end 312 of the second magnet 31 is less than that of the first end 311, the size of the protection member 32 wrapping the second magnet 31 is also diminished. Because the pen point 50 of the pointer has a tapered conical pen tip 51, the second magnet 31 of the second electromagnetic unit 30 in this embodiment can go deep into the pen point 50 with the second end 312 thereof, and the second magnet 31 is made close to the conical pen tip 51 as much as possible. Based on this, the pointer in this embodiment may be closer to the digitizer tablet in use, thereby improving accuracy and stability of coordinates and a pressure gradation of the pen tip 51 of the pointer.

Further, referring to FIG. 1 and FIG. 2, there may be a plurality of phases 313 between the first end 311 and the second end 312 of the second magnet 31, each phase 313 may be an inclined surface having a slope, a straight section whose slope is zero, or a curved surface having no slope, and the phases 313 between the first end 311 and the second end 312 of the second magnet 31 may be selected from the foregoing structure configurations or a combination thereof. When the phases 313 between the first end 311 and the second end 312 of the second magnet 31 are selected from the combination of the foregoing structure configurations, the premise that the outer diameter of the first end 311 is greater than the outer diameter of the second end 312 is followed. In the embodiment in FIG. 1, there are a straight section whose slope is zero and a curved surface between the first end 311 and the second end 312 of the second magnet 31.

Moreover, further referring to FIG. 1 and FIG. 2, the second end 312 of the second magnet 31 is of a round ball shape, and the second end 312 of the second magnet 31 faces the port 12. Therefore, when the pointer carelessly falls down or is subjected to an impact force at the port 12, in addition to that the second magnet 31 absorbs the impact force by means of the buffering capability of the material of the protection member 32, the second end 312 of the round ball shape of the second magnet 31 can further prevent a stress concentration phenomenon from occurring in the second end 312 of the second magnet 31, and can further prevent a situation in which the second magnet 31 is damaged because of being subjected to the impact force, thereby further prolonging the product service life.

The elastic member may be an elastomer made of a compression spring, an extension spring, or another elastic material. Referring to FIG. 1 and FIG. 2 cooperatively, the elastic member includes a first elastic member 40, and the first elastic member 40 may be an ordinary coil spring, conical spring, or disc spring, or another elastic material having a compression capability. The first elastic member 40 may directly or indirectly butt the second electromagnetic unit 30 to provide an elastic force in the axial direction X to the second electromagnetic unit 30. The pen point 50 is movably disposed at the port 12 of the casing 10 and is connected to the protection member 32. In this case, the pen point 50 is locally and correspondingly located in the first section 111A of the accommodation space 11 of the casing 10, and the conical pen tip 51 protrudes from the port 12 and is used to perform pointing control.

Based on this, when the pen point 50 is pressed, the second electromagnetic unit 30 can be driven to elastically move relative to the first electromagnetic unit 20, and can automatically recover to an initial location when the pressure is released.

Further, to ensure that the pointer can change a relative location between the second magnet 31 and the first magnet 21 in an allowable displacement range of the pen point 50 thereof, the first elastic member 40 has an elastic compression length, and a distance between the second electromagnetic unit 30 and the first electromagnetic unit 20 in the axial direction X is a displacement length of the pen point. In this embodiment, the elastic compression length of the first elastic member 40 is greater than displacement length of the pen point. Therefore, the pen point 50 of the pointer can butt the first elastic member 40 to move in a displacement range allowed in the structure thereof. In this way, in a use process of the pointer, after the pen point 50 of the pointer is compressed, the second electromagnetic unit 30 can be pushed back to the initial location by means of an elastic restoration force of the first elastic member 40, thereby ensuring that an electromagnetic induction value may also recover to an initial value for next use.

Further, referring to FIG. 1 and FIG. 2 continuously and cooperatively, to improve stability of the entire structure and facilitate positioning of the first magnet 21, a first fixing member 60 is further included, and the first fixing member 60 is fixed in the accommodation space 11 of the casing 10. In this case, the first fixing member 60 has a recessed hole 61, a shaft hole 62, and a limit slot 63, and the recessed hole 61 and the limit slot 63 are in communication with each other through the shaft hole 62. More specifically, the shape and size of the recessed hole 61 may accommodate the shape and size of an outer circumferential outline of the first magnet 21, and an inner circumferential outline of the shaft hole 62 is the same as an inner circumferential outline of the through-hole 211. Based on this, one end of the first magnet 21 butts the recessed hole 61 and can be located at a fixed location, and one end of the coil 22 may butt one of end surfaces of the first fixing member 60. The shaft portion 322 of the protection member 32 of the second electromagnetic unit 30 stretches into the limit slot 63 by using the shaft hole 62.

The second electromagnetic unit 30 further includes a shaft portion supporting component 33. The shape and size of an outer outline of the shaft portion supporting component 33 are less than the size of an inner circumferential outline of the limit slot 63, and the outer outline of the shaft portion supporting component 33 is greater than the outer diameter of the shaft portion 322. The shaft portion supporting component 33 is accommodated in the limit slot 63 and may move in the limit slot 63 along the axial direction X, one end of the shaft portion 322 of the protection member 32 stretching into the limit slot 63 is bound to an internal location of the shaft portion supporting component 33, one end of the first elastic member 40 butts the first fixing member 60, and another end butts the shaft portion supporting component 33. Therefore, the first elastic member 40 generates an elastic force for the second electromagnetic unit 30 through the shaft portion supporting component 33, thereby ensuring that the pen point 50 has an elastic recovery force in the entire touch process.

Moreover, in an embodiment, referring to FIG. 1 and FIG. 2 cooperatively, furthermore, to ensure stability of accommodating the first elastic member 40 in the limit slot 63, the limit slot 63 of the first fixing member 60 further has a boss 631. The shaft portion supporting component 33 has a butting portion 331 and a concave portion 332, and the concave portion 332 is located at the circumference of the butting portion 331 and is depressed relative to the butting portion 331. In this embodiment, one end of the first elastic member 40 sleeves over the butting portion 331 and butts the inside of the concave portion 332, and another end sleeves over the boss 631 and butts an inner wall of the limit slot 63 of the first fixing member 60. In this way, the first elastic member 40 cooperates with the boss 631 and can be stably located in the limit slot 63, to ensure that the first elastic member 40 is not inclined when being pressed, and ensure a displacement path of the second electromagnetic unit 30. Further, signal changes are consistent with those in the original design idea.

Further, to enable the pointer to present a pressure gradation in the use process, the elastic member may further include a second elastic member 70, and the second elastic member 70 is an elastic block. The second elastic member 70 is disposed in the accommodation space 11, and is located in a direction in which the second magnet 31 moves closer to the first magnet 21. When the pen point 50 is not pressed, there is a distance between the second electromagnetic unit 30 and the second elastic member 70 in the axial direction X. In the displacement process of the second electromagnetic unit 30, the second electromagnetic unit 30 first compresses the first elastic member 40 and then compresses the second elastic member 70. Additionally it should be noted that, in an aspect of providing the elastic restoration force of the pen point 50, both the first elastic member 40 and the second elastic member 70 may be selected, or only either the first elastic member 40 or the second elastic member 70 is selected.

In this embodiment, the second elastic member 70 is accommodated in the accommodation space 11 of the casing 10 and is located in an extension direction of the central axial direction X of the casing 10 but is not limited thereto. In this example, the second elastic member 70 is located between one end of the shaft portion 322 of the protection member 32 away from the port 12 and another end of the casing 10. In this case, the second elastic member 70 may be made of a rubber material having an elastic coefficient different from that of the first elastic member 40 or another material having an elastic recovery force, so as to recover to an original shape after being compressed and provide an elastic restoration force of the second electromagnetic unit 30.

More specifically, in this embodiment, a face of the second elastic member 70 facing the shaft portion supporting component 33 is a plane. In this way, the second electromagnetic unit 30 butts the second elastic member 70 through the shaft portion supporting component 33. Through a corresponding shape between the shaft portion supporting component 33 and the limit slot 63, the shaft portion supporting component 33 is limited by the limit slot 63 during displacement and can move along the axial direction X stably and non-slantwise, so as to ensure that the second electromagnetic unit 30 moves along a stable displacement path, thereby obtaining consistent action and change effects.

In an embodiment, referring to FIG. 1 and FIG. 2 continuously, the pen point 50 has a sleeve slot 52. The head section 321 of the protection member 32 is locally embedded in the sleeve slot 52 of the pen point 50 to be bound to the pen point 50. More specifically, in this embodiment, the head section 321 of the protection member 32 has a head end 3211, a neck section 3212, a first trunk section 3213, and a second trunk section 3214 that are sequentially connected. The head end 3211 is of a structure of a round ball shape, the head end 3211 smoothly necks down to the neck section 3212, the neck section 3212 gradually enlarges to become the first trunk section 3213, and the first trunk section 3213 expands to the second trunk section 3214 in stages. The shape of the sleeve slot 52 of the pen point 50 corresponds to the shape of an outer outline of the head end 3211, the neck section 3212, and the first trunk section 3213 of the head section 321 of the protection member 32. Therefore, the pen point 50 can be detachably mounted at the head section 321 of the protection member 32 through the sleeve slot 52, and when the pen point is worn or deformed, a user can replace the needed pen point 50, so as to replace the pen point 50, and therefore maintain an optimal writing hand feeling.

Further, the head section 321 of the protection member 32 has the head end 3211, the neck section 3212 and the first trunk section 3213 whose outer outlines are different. Therefore, after the pen point 50 sleeves over the protection member 32, the neck section 3212 necking down at most may limit displacement of the head end 3211 and the first trunk section 3213 whose outer diameters are greater than that of the neck section 3212, and can prevent the pen point 50 from falling off, thereby improving structure stability.

Figure 4:
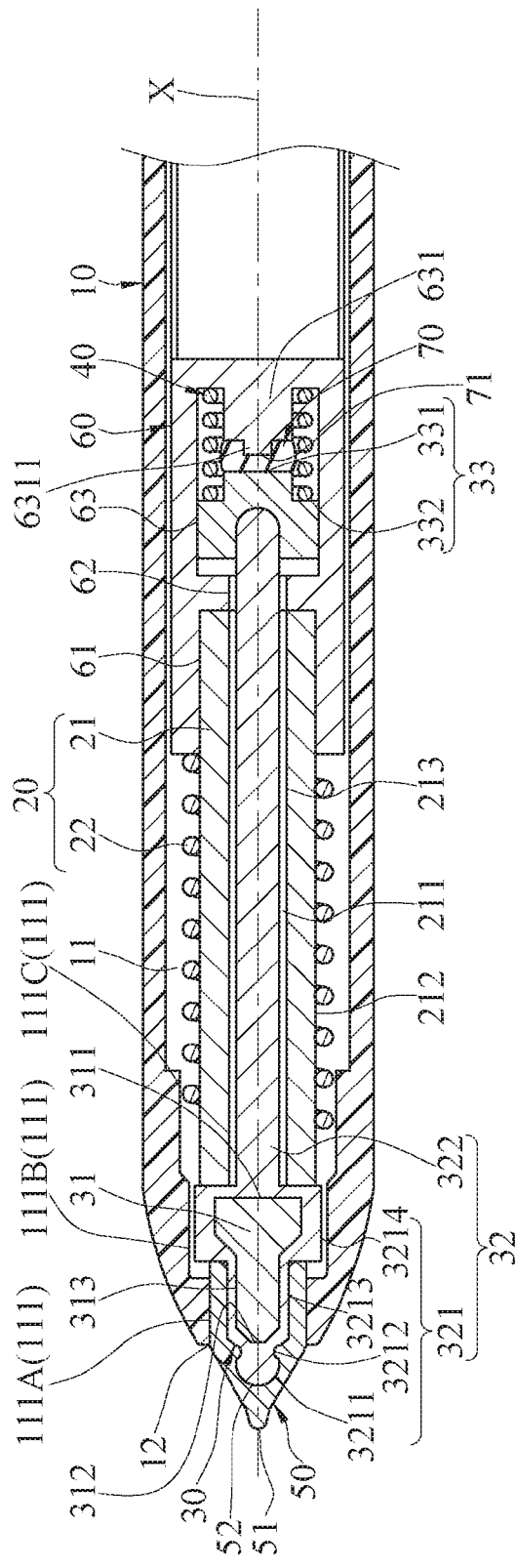
FIG. 4 is a schematic diagram of a use state of a pressed pen point in an example of FIG. 3.

Referring to FIG. 3 and FIG. 4 cooperatively that show another embodiment of the present invention, FIG. 4 is a schematic diagram of a use state of a pressed pen point 50 of an embodiment of FIG. 3. This embodiment is roughly the same as the embodiment of FIG. 1 and FIG. 2 in structure configuration and is not described in detail. Only differences are described below.

Referring to FIG. 3 and FIG. 4, in this embodiment, a face of a second elastic member 70 close to a boss 631 has a concave opening 71, and a face of the boss 631 facing the second elastic member 70 has a convex portion 6311. In this way, the second elastic member 70 sleeves over the convex portion 6311 positioned at the boss 631 by using the concave opening 71 thereof, so that the second elastic member 70 is more stably positioned in a limit slot 63. Similarly, a displacement path of a second electromagnetic unit 30 applying a pressure to the second elastic member 70 can be ensured, so that signal changes are consistent with those of the original design idea.

In addition to this, in this embodiment, there are a straight section whose slope is zero and an inclined surface having a slope between a first end 311 and a second end 312 of a second magnet 31, and the cross section of the second end 312 is of a shape of a rough trapezoid.

Figure 5:
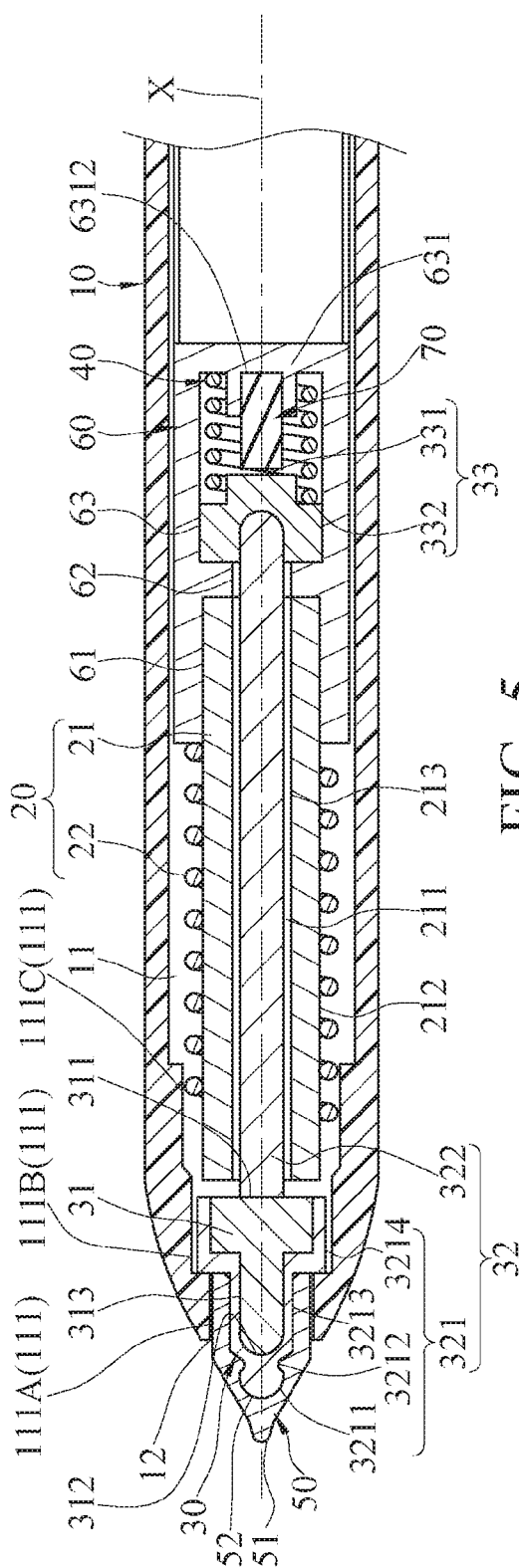
FIG. 5 is a schematic structural cross-sectional diagram of still another embodiment of a pointer of the present invention.
Figure 6:
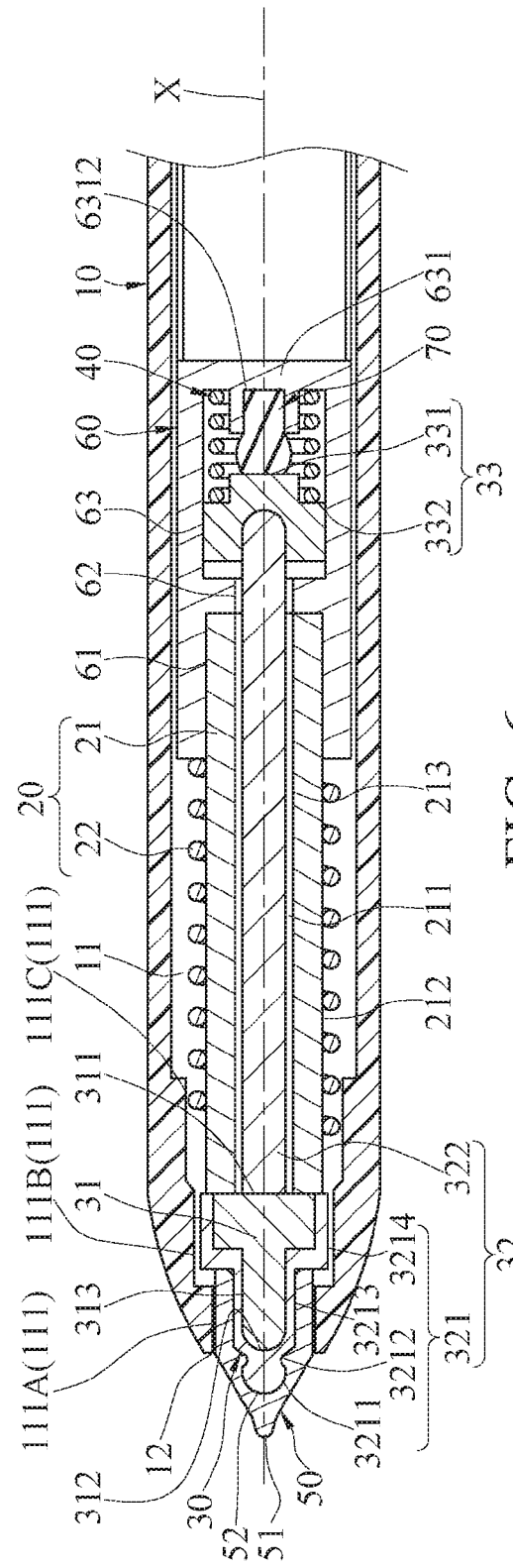
FIG. 6 is a schematic diagram of a use state of a pressed pen point in an example of FIG. 5.

Then, referring to FIG. 5 and FIG. 6 cooperatively, FIG. 5 and FIG. 6 are sectional structural views of another embodiment of the present invention. FIG. 6 is a schematic diagram of a use state of a pressed pen point 50 of the embodiment of FIG. 5. The embodiment of FIG. 5 and FIG. 6 is roughly the same as the foregoing embodiment and is not described in detail. Only differences are described below.

Referring to FIG. 5 and FIG. 6, in this embodiment, a head section 321 and a shaft portion 322 of a protection member 32 of a second electromagnetic unit 30 are two separate independent components, the head section 321 and the shaft portion 322 may be separately made of different materials or a same material, and in structure configuration, the shaft portion 322 is similarly butted between the head section 321 and a shaft portion supporting component 33, so as to achieve an objective and an effect the same as those in the foregoing embodiment.

Moreover, in this embodiment, a boss 631 of a first fixing member 60 has a groove 6312, and a second elastic member 70 is inserted in the groove 6312, thereby maintaining stability of the second elastic member 70 and achieving an objective or effect the same as that in the foregoing embodiments.

Figure 7:
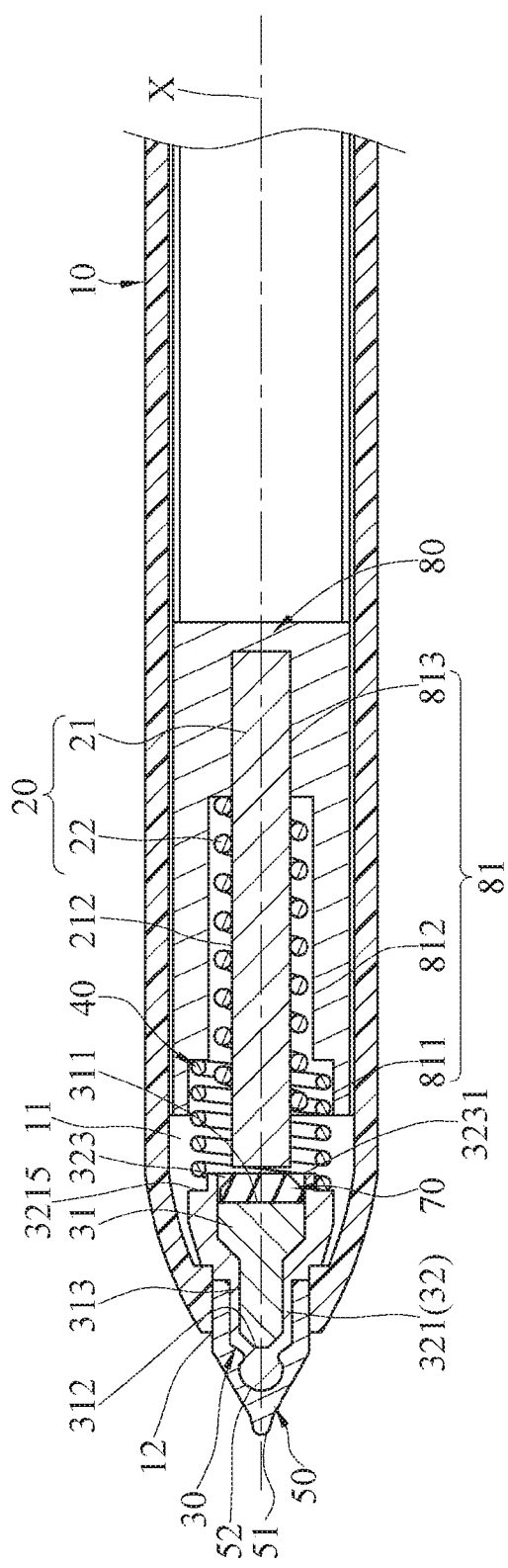
FIG. 7 is a schematic structural cross-sectional diagram of yet another embodiment of a pointer of the present invention.
Figure 8:
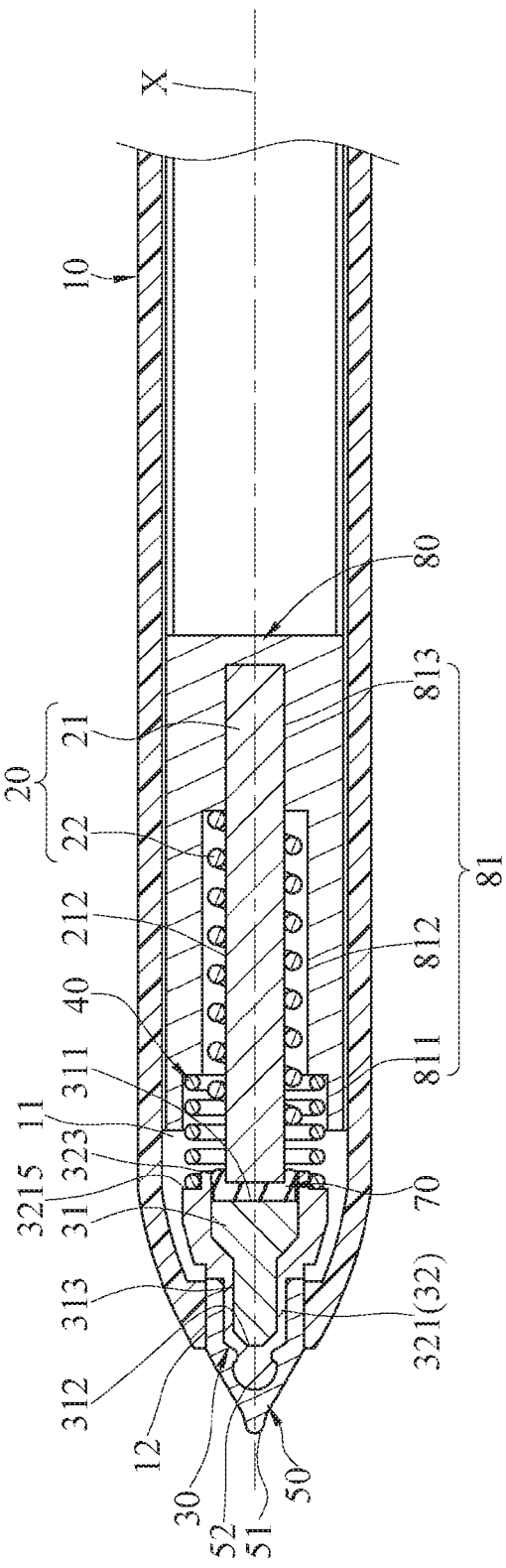
FIG. 8 is a schematic diagram of a use state of a pressed pen point in an example of FIG. 7.

Then, referring to FIG. 7 and FIG. 8 cooperatively, FIG. 7 and FIG. 8 are sectional structural views of another embodiment of the present invention. FIG. 8 is a schematic diagram of a use state of a pressed pen point 50 of the embodiment of FIG. 7. Main differences from the foregoing embodiments lie in that a first magnet 21 of a first electromagnetic unit 20 of a pointer in FIG. 7 and FIG. 8 is of a solid column structure, a protection member 32 of a second electromagnetic unit 30 has only a head section 321, and a second elastic member 70 is disposed between the first electromagnetic unit 20 and the second electromagnetic unit 30. Further, a second fixing member 80 may be disposed cooperatively to accurately position the first magnet 21 of the first electromagnetic unit 20.

In this embodiment, referring to FIG. 7 cooperatively, the protection member 32 of the second electromagnetic unit 30 locally wraps a second magnet 31. Specifically, the protection member 32 wraps the second magnet 31 by using the head section 321. In this case, the head section 321 of the protection member 32 has a sleeve slot 323, the sleeve slot 323 has a sleeve slot opening 3231, the shape of the sleeve slot 323 corresponds to the shape of the second magnet 31, and the shape and size of the sleeve slot opening 3231 correspond to the shape and size of the first end 311 of the second magnet 31, so that the second magnet 31 may be inserted and positioned in the sleeve slot 323 through the sleeve slot opening 3231. Moreover, in this embodiment, the second elastic member 70 is fixed to the first end 311 of the second magnet 31 and is accommodated in the sleeve slot 323, and is located between the first magnet 21 and the second magnet 31.

Further, a second fixing member 80 is fixedly disposed in the accommodation space 11 of the casing 10. In this case, the second fixing member 80 has a limit slot 81, the limit slot 81 includes a first slot section 811, a second slot section 812 and a third slot section 813, the first slot section 811 is connected to a slot opening, the third slot section 813 is connected to a slot bottom, and the second slot section 812 is connected to the first slot section 811 and the third slot section 813. Therefore, the first magnet 21 of the first electromagnetic unit 20 is inserted in the third slot section 813 and butts the slot bottom of the limit slot 81. The coil 22 winds around the first magnet 21 and may butt a section gap between the third slot section 813 and the second slot section 812. One end of the first elastic member 40 may sleeve over the first magnet 21 and the coil 22 and abut against a section gap between the first slot section 811 and the second slot section 812. In this way, the first magnet 21 of the first electromagnetic unit 20, the coil 22 and the first elastic member 40 can all be stably limited by the second fixing member 80. Further, a butting edge 3215 is further depressed from an outer circumferential surface of the head section 321 of the protection member 32. In this way, another end of the first elastic member 40 may abut against the butting edge 3215.

Therefore, when the pointer is used and a pressure is applied to the pen point 50, the pen point 50 drives the head section 321 of the protection member 32 of the second electromagnetic unit 30 to move inward the casing 10 along the axial direction X, the head section 321 of the protection member 32 drives the second magnet 31 and the second elastic member 70 to move, so as to change a relative location between the first magnet 21 and the second magnet 31, and change an electromagnetic frequency to simulate a pen touch pressure. The protection member 32 can provide a buffering capability when the pointer is subjected to an impact force, to protect the second magnet 31 from being damaged, and ensure that the location thereof does not deviate and sensing is not affected. Moreover, the first elastic member 40 can also enable the second electromagnetic unit 30 to maintain an elastic displacement capability, thereby ensuring operation smoothness.

Figure 9:
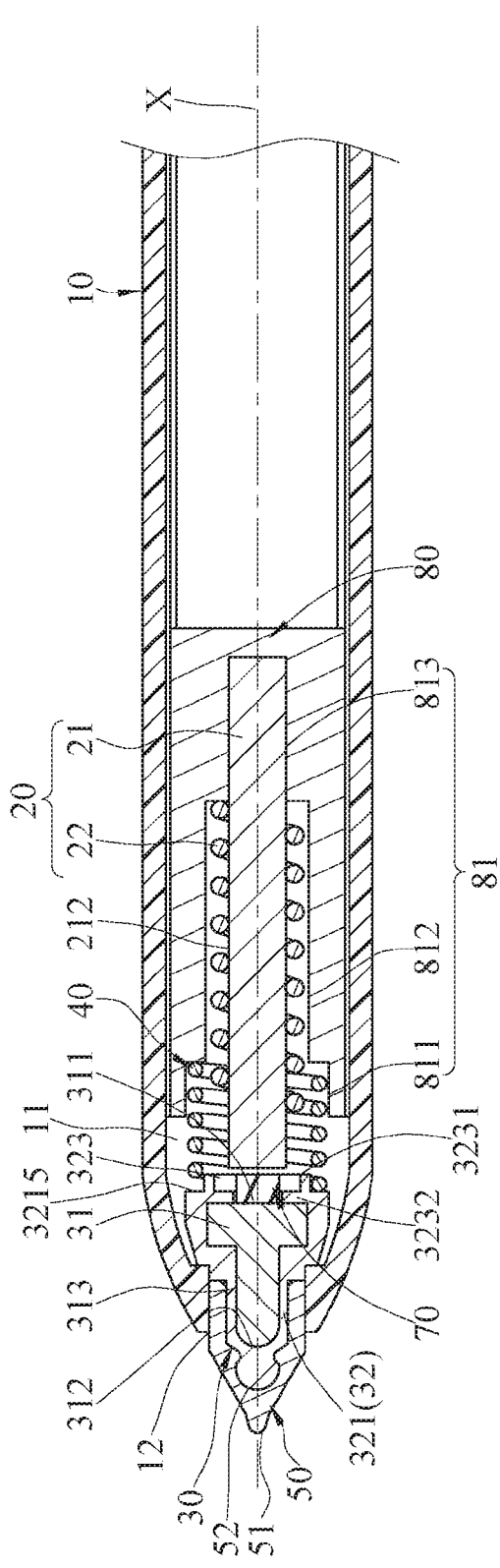
FIG. 9 is a schematic structural cross-sectional diagram of still yet another embodiment of a pointer of the present invention.
Figure 10:
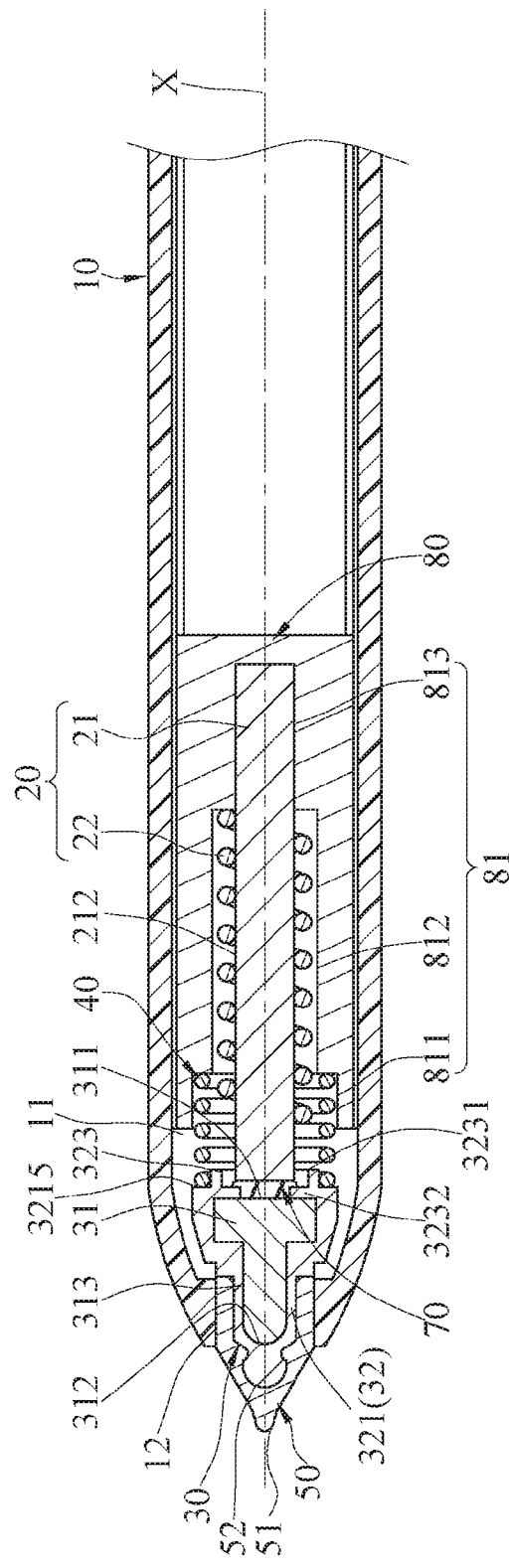
FIG. 10 is a schematic diagram of a use state of a pressed pen point in an example of FIG. 9.

Then, referring to FIG. 9 and FIG. 10 cooperatively, FIG. 9 and FIG. 10 are sectional views of another embodiment of a pointer of the present invention. FIG. 10 is a schematic diagram of a use state of a pressed pen point 50 of the embodiment of FIG. 9. The embodiment of FIG. 9 and FIG. 10 is roughly the same as the embodiment shown in FIG. 7 and FIG. 8 and is not described in detail. Only differences are described below.

Referring to FIG. 9 and FIG. 10, in this embodiment, a stop edge 3232 further exists in a sleeve slot 323 of a protection member 32, the stop edge 3232 is located on an inner circumferential surface of the sleeve slot 323, and the stop edge 3232 is located between a sleeve slot opening 3231 and the slot bottom of the sleeve slot 323. Moreover, an inner circumferential outline of the stop edge 3232 is less than an outer circumferential outline of a first end 311 of a second magnet 31. In this way, the second magnet 31 is accommodated between the slot bottom of the sleeve slot 323 and the stop edge 3232, and the second elastic member 70 is inserted in the inner outline of the stop edge 3232 and is bound to the second magnet 31. In this way, the second magnet 31 and the second elastic member 70 can be more stably positioned, thereby improving structure stability and sensing accuracy.

Figure 11:
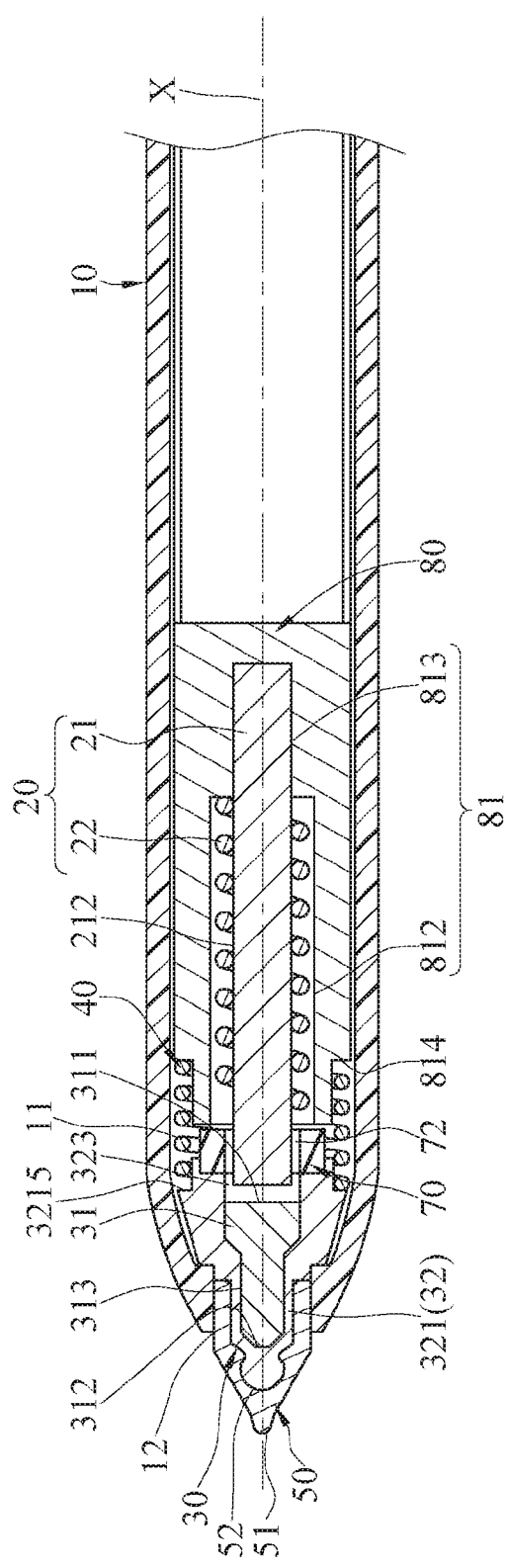
FIG. 11 is a schematic structural cross-sectional diagram of a further embodiment of a pointer of the present invention.
Figure 12:
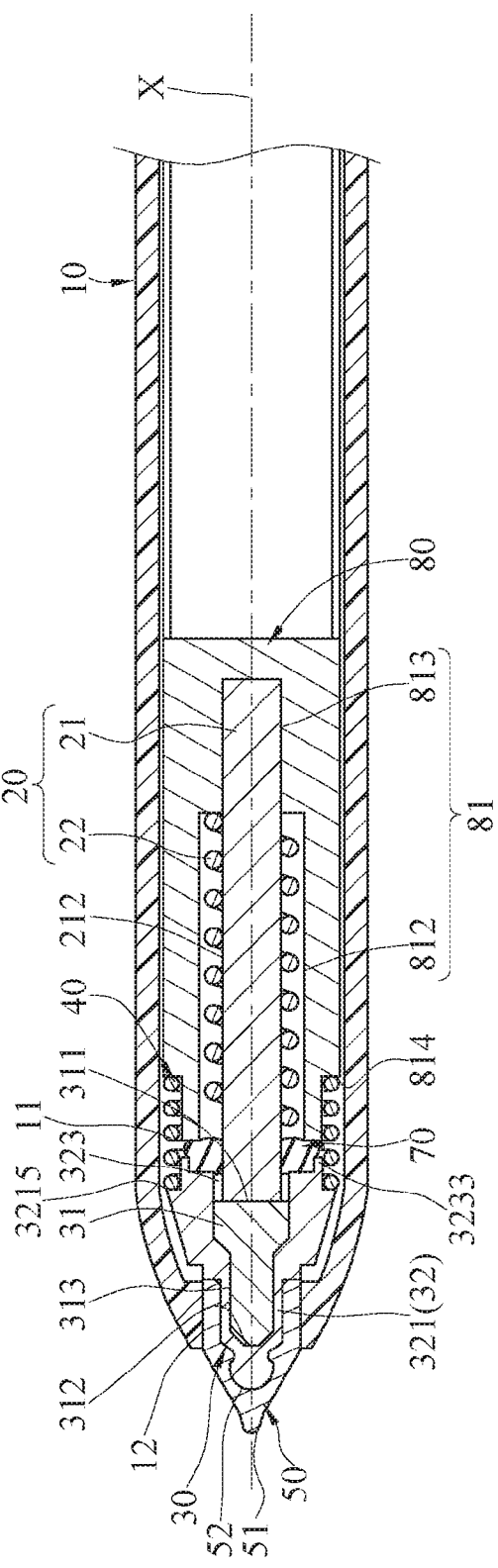
FIG. 12 is a schematic diagram of a use state of a pressed pen point in an example of FIG. 11.
Figure 13:
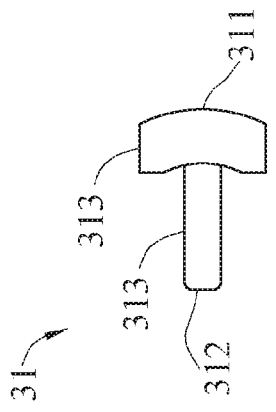
Figure 14:
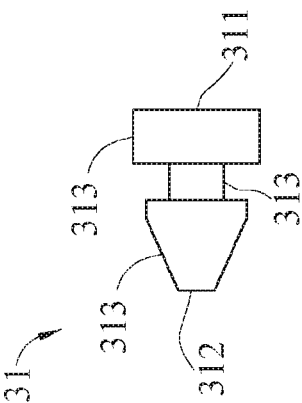
Figure 15:
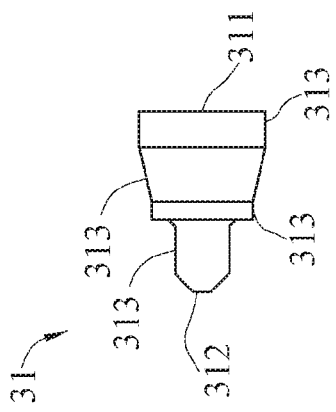
Figure 16:
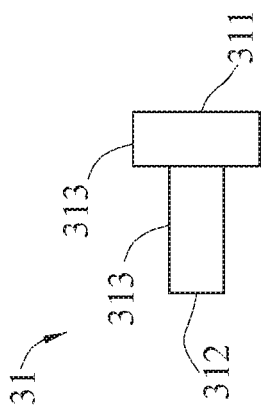
Figure 24:
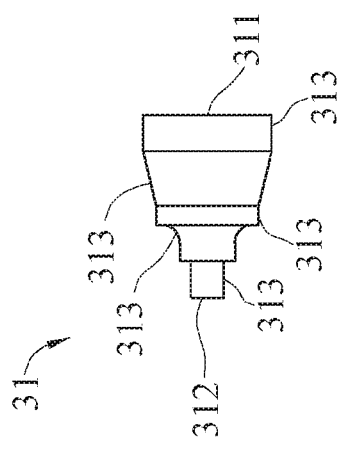
Figure 23:
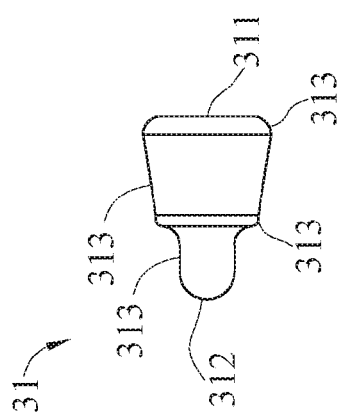
Figure 22:
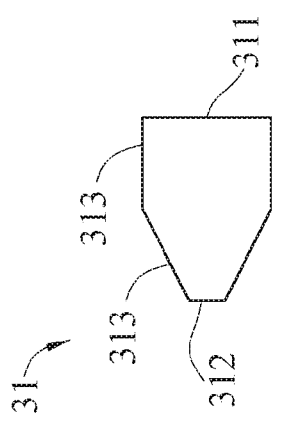
Figure 21:
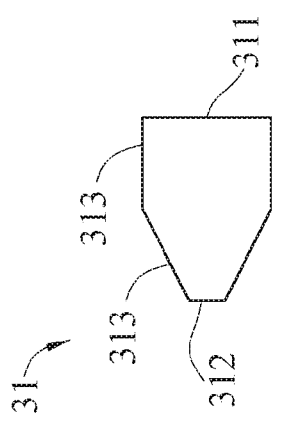
Figure 25:
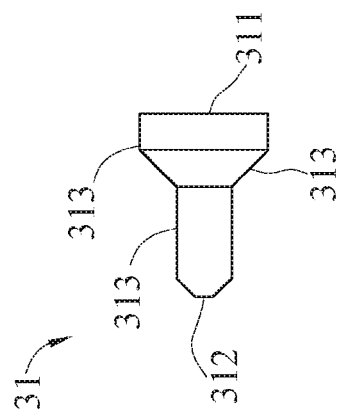
Figure 26:
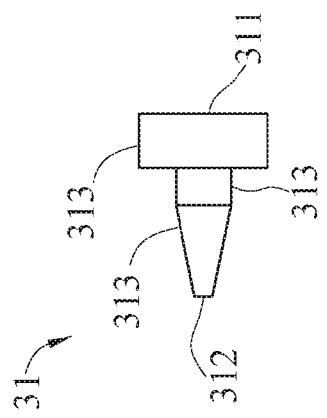
Figure 27:
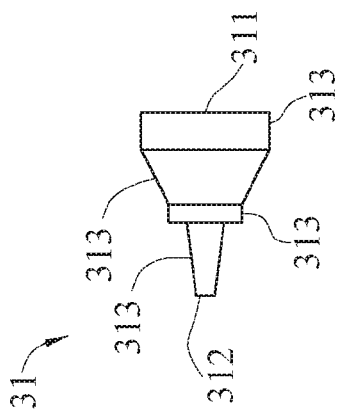
Figure 28:
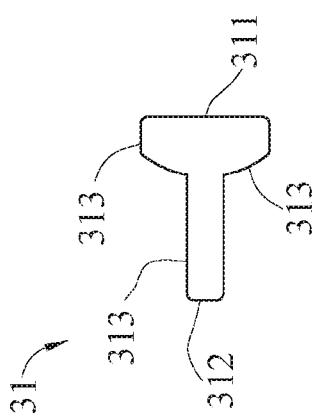

Then, referring to FIG. 11 and FIG. 12 cooperatively, FIG. 11 and FIG. 12 are sectional views of another embodiment of a pointer of the present invention. FIG. 12 is a schematic diagram of a use state of a pressed pen point 50 of the embodiment of FIG. 11. The embodiment of FIG. 11 and FIG. 12 is roughly the same as the embodiment shown in FIG. 7 and FIG. 8 and is not described in detail. Only differences are described below.

Referring to FIG. 11 and FIG. 12, in this embodiment, a head section 321 further has an end edge 3233, and the end edge 3233 is located on another end surface of the head section 321 different from a head end 3211. In this case, a second magnet 31 is accommodated in a sleeve slot 323, and a second elastic member 70 is centrally provided with a perforation 72. The second elastic member 70 is disposed in the end edge 3233, and the perforation 72 is in communication with a sleeve slot opening 3231. Moreover, in this embodiment, a limit slot 81 of a second fixing member 80 includes only a second slot section 812 and a third slot section 813, the third slot section 813 is connected to the slot bottom, the second slot section 812 and the third slot section 813 are connected to the slot opening, and an outer circumferential surface at one end of the second fixing member 80 having the slot opening further has an outer ring slot 814.

Therefore, the first magnet 21 is inserted in the third slot section 813, one end of the first magnet 21 butts the slot bottom of the limit slot 81, and another end stretches out from the slot opening of the limit slot 81 and runs through the sleeve slot 323 of the head section 321 through the perforation 72 of the second elastic member 70. The coil 22 winds around the first magnet 21 and butts a section gap between the third slot section 813 and the second slot section 812. One end of the first elastic member 40 sleeves over the outer circumferential edge of the second fixing member 80 and abuts against the outer ring slot 814, and another end butts the butting edge 3215 of the head section 321. Therefore, the pointer can similarly achieve an objective and an effect the same as those of the foregoing embodiment.

In some embodiments, the shape of the second magnet 31 of the second electromagnetic unit 30 may further have other changes on the basis that the first end 311 is greater than the second end 312, and changes thereof are, for example, shown in FIG. 13 to FIG. 28. There may be a plurality of phases 313 between the first end 311 and the second end 312 of the second magnet 31, and each phase 313 may be selected from a straight section whose slope is zero, an inclined surface whose slope is not zero, a curved surface, or a combination thereof.

It can be known from the foregoing description that, in each embodiment of this application, the protection member 32 whose structure pattern is not limited completely or locally wraps the second magnet 31 to protect the second magnet 31, so as to prevent the second magnet 31 from being damaged or deviating when being subjected to an impact, thereby ensuring accuracy and resolution of location coordinates and a pen touch pressure of the electromagnetic pointer. Moreover, the second magnet 31 becomes an aspect in which the first end 311 is greater than the second end 312, so that the second magnet 31 may be closer to the port 12 of the casing 10 and the digitizer tablet, thereby improving sensing strength. A corresponding structure between the pen point 50 and the protection member 32 can also be provided for the user to replace the pen point 50, thereby improving the degree of freedom in use.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A pointer, comprising:
  a casing, having an accommodation space and a port, wherein the port is in communication with the accommodation space;
  a first electromagnetic unit, comprising a first magnet and a coil, wherein the first magnet is fixedly disposed in the accommodation space, and the coil winds around the first magnet;
  a second electromagnetic unit, movably disposed in the accommodation space of the casing along an axial direction, wherein
    the second electromagnetic unit comprises a second magnet and a protection member,
    the protection member wraps the second magnet, and
    the second magnet is relatively away from or close to the first magnet;
  an elastic member, disposed in the casing and providing an elastic force to the second electromagnetic unit along the axial direction; and
  a pen point, movably disposed at the port of the casing and connected to the protection member, such that, when a pressure is applied to the pen point, the pen point drives the protection member to move, and the protection member drives the second magnet to move, wherein
  the pen point has a sleeve slot, the protection member has a head end, and the head end of the protection member is accommodated in the sleeve slot, and
  the head end has a trunk section, a neck section, and a head section that are sequentially connected, and the outer diameter of the neck section is less than the outer diameter of the trunk section and the outer diameter of the head section.

2. The pointer according to claim 1, wherein the elastic member comprises a first elastic member, disposed in the accommodation space, and the first elastic member is a coil spring.

3. The pointer according to claim 2, wherein the elastic member further comprises a second elastic member, disposed in the accommodation space, and located in a direction in which the second magnet moves closer toward the first magnet, and the second elastic member is an elastic block.

4. The pointer according to claim 3, wherein elastic coefficients of the first elastic member and the second elastic member are different.

5. The pointer according to claim 3, wherein the first magnet is of a hollow structure and has a through-hole, the protection member has a head section and a shaft portion, the head section wraps the second magnet, the shaft portion runs through the through-hole, and there is a displacement distance between the head section and the first magnet in the axial direction.

6. The pointer according to claim 5, wherein the first elastic member is located at a side of the shaft portion away from the port.

7. The pointer according to claim 3, wherein the first magnet is a solid column, the protection member has a head section, the head section wraps the second magnet, and there is a displacement distance between the first magnet and the head section.

8. The pointer according to claim 7, wherein the first elastic member is located between the first electromagnetic unit and the second electromagnetic unit.

9. The pointer according to claim 1, wherein there is a displacement distance between the second electromagnetic unit and the first electromagnetic unit in the axial direction, the elastic member has a compression distance, and the compression distance is greater than the displacement distance.

10. The pointer according to claim 1, wherein the second magnet has a first end and a second end opposite to each other, the outer diameter of the first end is greater than the outer diameter of the second end, the first end is close to the first magnet, and the second end is close to the pen point.

11. A pointer, comprising:
  a casing, having an accommodation space and a port, wherein the port is in communication with the accommodation space;
  a first electromagnetic unit, comprising a first magnet and a coil, wherein the first magnet is fixedly disposed in the accommodation space, and the coil winds around the first magnet;
  a second electromagnetic unit, movably disposed in the accommodation space of the casing along an axial direction, wherein
    the second electromagnetic unit comprises a second magnet and a protection member,
    the protection member wraps the second magnet, and
    the second magnet is relatively away from or close to the first magnet;
  an elastic member, disposed in the casing and providing an elastic force to the second electromagnetic unit along the axial direction; and
  a pen point, movably disposed at the port of the casing and connected to the protection member, wherein
  the pen point has a sleeve slot, the protection member has a head end, and the head end of the protection member is accommodated in the sleeve slot, and
  the head end has a trunk section, a neck section, and a head section that are sequentially connected, and the outer diameter of the neck section is less than the outer diameter of the trunk section and the outer diameter of the head section.

* * * * *